United States Patent [19]
Jory et al.

[11] Patent Number: 5,187,877
[45] Date of Patent: Feb. 23, 1993

[54] CRAFTSMAN'S ADJUSTABLE ANGLE INSTRUMENT

[76] Inventors: John Jory, 11339 Chenault St., Los Angeles, Calif. 90049; Lawrence W. Fay, 17945 Via La Cresta, Chino, Calif. 91709

[21] Appl. No.: 905,673

[22] Filed: Jun. 29, 1992

[51] Int. Cl.$^5$ .............................................. B27G 23/00
[52] U.S. Cl. ...................................... 33/640; 33/465; 33/471; 33/538
[58] Field of Search ............... 33/626, 633, 634, 640, 33/641, 628, 630, 403, 424, 465, 471, 495, 496, 497, 498, 499, 500, 418, 481, 452, 469, 534, 535, 538, 202; 83/522.19, 522.16, 522.18; D10/65

[56] References Cited

U.S. PATENT DOCUMENTS

| | | | |
|---|---|---|---|
| 2,632,483 | 3/1953 | Jamack | 33/499 |
| 2,666,261 | 1/1954 | Buick | 33/424 |
| 2,735,185 | 2/1956 | Naphtal | 33/497 |
| 3,109,242 | 11/1963 | Nyitrai | 33/538 |
| 3,252,223 | 5/1966 | Gettel | 33/633 |
| 3,331,134 | 7/1967 | Jackson et al. | 33/534 |
| 3,426,434 | 2/1969 | Zarling | 33/424 |
| 4,221,055 | 9/1980 | Delgado | 33/424 |
| 4,443,950 | 4/1984 | Cockerman | 33/628 |
| 4,779,354 | 10/1988 | Hill | 33/640 |
| 5,121,553 | 6/1992 | Boerder | 33/640 |

FOREIGN PATENT DOCUMENTS

| | | | |
|---|---|---|---|
| 194612 | 3/1923 | United Kingdom | 33/424 |
| 837153 | 6/1960 | United Kingdom | 33/538 |

*Primary Examiner*—Thomas B. Will
*Attorney, Agent, or Firm*—J. E. McTaggart

[57] ABSTRACT

An adjustable angle instrument for high precision craftsmanship is configured from a pair of similar metal sector parts, each having a sector shape with a wide double flange along a straight edge. The two sector parts are accurately pivoted together in an apex region. Each flange is made to have accurate surfaces on its outer surfaces on which the instrument may be stood in a vertical position or laid horizontally on a flat surface such as a saw table. The flanges may be set to any angle between 45 and 90 degrees as indicated by a calibratable hairline cursor, and the angle may be captured by locking the two sector parts together by tightening a knurled brass knob. One of the sector parts is also provided with an edge which is accurately machined at 90 degrees relative to the flange and thus may be set to any angle between 0 to 45 degrees relative to the other flange, providing the instrument with a total range of 0 to 90 degrees. The scale, made as separate part and attached to one of the sector parts, extends along an arc of about seven inches at a nine inch radius and is machine marked to provide 0-45 and 45-90 degree ranges with accuracy better than ±0.05 degrees. The instrument may be used to set up various types of power saws and other machinery, to act as a workpiece guide and to mark angles on workpieces. It is also useful as a drafting aid and as a highly accurate instrument for general measurement of angles. Each of the instruments's two flanges is provided with four mounting holes which may be utilized for adding extensions in either width or length.

12 Claims, 4 Drawing Sheets

CRAFTSMAN'S ADJUSTABLE ANGLE INSTRUMENT

FIELD OF THE INVENTION

The present invention relates to craftsmen's instruments and more particularly it relates to an adjustable angle instrument for directed to but not restricted to precision woodworking.

BACKGROUND OF THE INVENTION

There is a general need for an adjustable angle instrument in precision craft work, particularly when materials such as wood, plastic or metal are to be cut accurately with some form of power saw such as a table saw, radial arm saw or portable saw. Adjustable angle devices have been used in various forms such as miter gauges either provided as part of the saw or utilized as a separate accessory; however their quality, durability, precision and accuracy have failed to fully satisfy contemporary requirements of precision craftsmanship.

PRIOR ART

A miter gauge of the general type commonly supplied with table saws is disclosed in U.S. Pat. No. 1,319,179 to Royle. Adjustable taper ripping jigs are disclosed in U.S. Pat. No. 2,672,897 to Cue and U.S. Pat. No. 2,032,976 to Carter. Other examples of adjustable angle devices for saws are found in U.S. patents: U.S. Pat. No. 2,010,882 to Ocenasek for a self indexing miter gauge, U.S. Pat. No. 2,719,548 to Mitchell for a saw guide tool for a portable power saw, U.S. Pat. No. 4,779,354 to Hill for a variable angle protractor and U.S. Pat. No. 2,906,303 to Abel for an offset measuring gauge and saw guide for portable power saws.

OBJECTS OF THE INVENTION

It is a primary object of the present invention to provide a sturdy adjustable angle instrument to meet the requirements of craftsmen working to the highest standards of accuracy and precision.

It is a further object that the instrument be capable of performing a large variety of different saw setup requirements including setting and checking miter angles, tapered ripping and blade tilting.

It is a further object that the instrument be readily usable in cooperation with existing saw guide apparatus.

It is a further object that the instrument be easy to use, being generally operable with one hand and in some instances with no hands required, leaving the craftsman's hands both free to make machinery adjustments.

It is a still further object that the instrument be provided with an easily read high-precision scale with capability of calibration.

It is a still further object to provide an adjustable angle instrument suitable for use in a variety of roles such as a drawing and drafting aid, a marking guide, an angle-measuring instrument, an adjustable power saw or other cutting machine setup jig and as an operational guide for workpieces in power saw operations such as angled crosscuts, miter joints and tapered ripping.

SUMMARY OF THE INVENTION

The above objects have been realized in the present invention by precisely pivoting a pair of similar 45 degree angled sector parts each having a wide flange with accurate outer surfaces on which the instrument may be rested vertically or horizontally on a flat surface such as a saw table. The two flanges may be set to any angle between 45 and 90 degrees as indicated by a calibratable hairline cursor, and locked in place by a knurled knob. One of the sector parts is provided with a reference edge which, being perpendicular to the flange, may be set to any angle between 0 and 45 degrees relative to the other flange, thus providing a total range of 0 to 90 degrees. The scale, extending along an arc of about seven inches covering both 45 degree halves of the total range at a nine inch radius, is machined separately and attached to the extruded and punched sector parts, providing accuracy better than +/−0.05 degrees.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
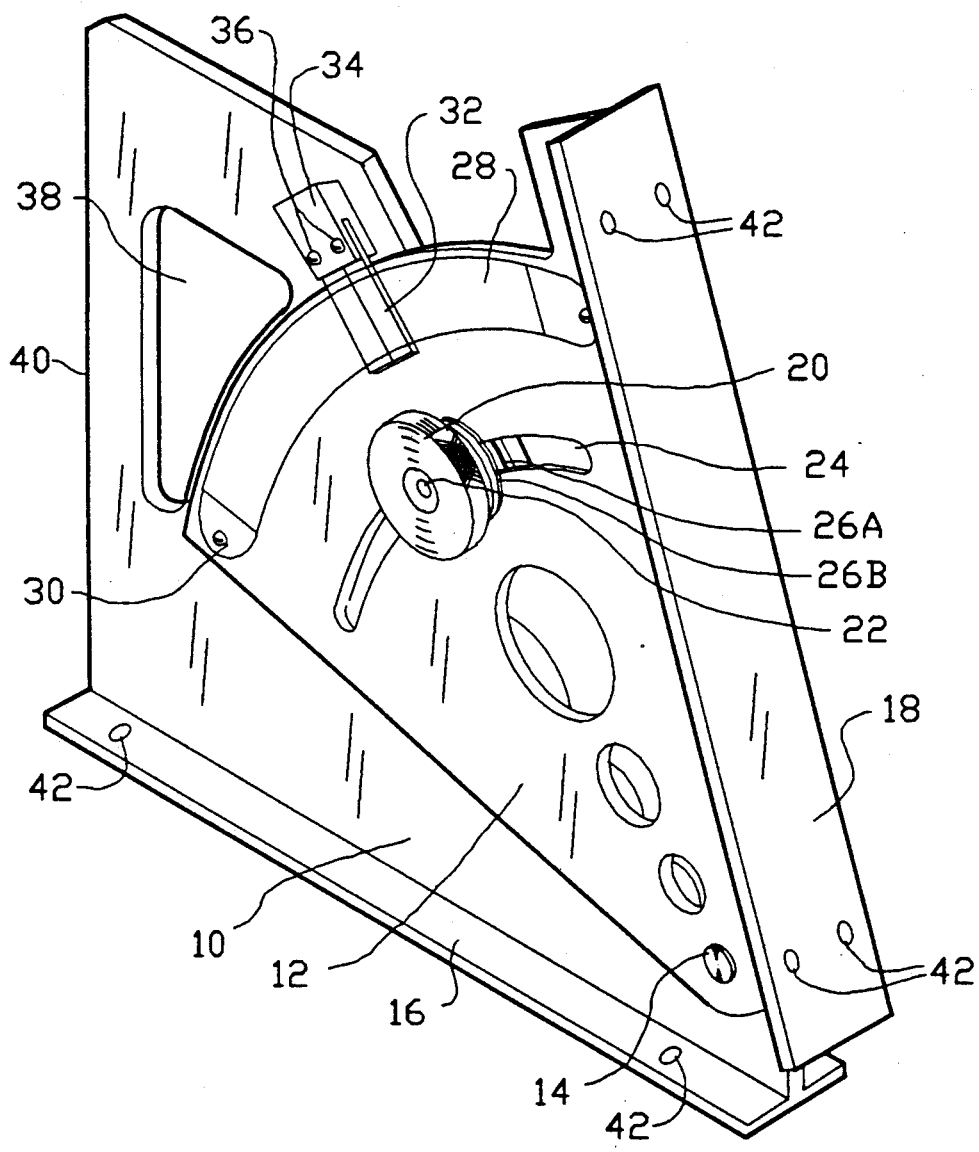
FIG. 1 is a three dimensional view of the adjustable angle instrument of the present invention set at a 60 degree angle.

In the three dimensional view of FIG. 1, the adjustable angle instrument of the present invention is shown in a preferred embodiment having a first sector part 10 and a second sector part 12, each sector part having two straight edges forming a 45 degree angle with each other. The two sector parts 10 and 12 are captivated together by a brass pivot pin 14 traversing both sector parts through a pair of accurately drilled holes, one in each sector part, located at a designated pivot point in the apex region. Pin 14 is retained by a spring C washer on the far side, spaced from sector part 10 by a flat washer; sector parts 10 and 12 are separated by a second flat washer on pin 14.

Part 10 is formed with a double flange 16 extending full length along its lower straight edge, and sector part 12 has a similar flange 18 along one of its straight edges as shown. The flanges 16 and 18 are slightly offset relative to the main portion of each sector part 10 and 12 so as to align the outer flange edges of the two sector parts in a common plane on each side when the sector parts are pivoted together side by side.

A brass lock knob 20 is threaded onto a stud 22 which is affixed in sector part 10 typically by a drive spline. A slot 24 in sector part 12 is made to have an arcuate shape concentric with pivot pin 14 and is dimensioned to clear stud 22 and allow the two sector parts to pivot and thus form an adjustable angle between flanges 16 and 18 ranging from 45 to 90 degrees. A pair of flat washers 26A and 26B are placed over stud 22: washer 26A is located between knob 20 and sector part 12, while washer 26B is between sector parts 10 and 12.

A curved scale 28 with divisional markings and numerals in degrees, attached to sector part 12 by a pair of drive pins 30, cooperates with a transparent cursor 32 having with a hairline marking to precisely indicate the angle as set between flanges 16 and 18. Cursor 32 is clamped in a channel in a brass mounting block 34 by a pair of machine screws 36 holding the cursor 32 spaced away from sector part 10 so as to be disposed in a close working relationship with scale 28.

Part 10 is shaped as shown with its left hand edge 40 machined to form an angle of 90 degrees relative to the bottom flange 16; this 90 degree angle is made to have an accuracy of 2 minutes of a degree or better. A three-sided opening 38 is provided as shown to serve for clamping edge 40, e.g. against a work surface, machine surface or an extension sector part. Opening 38 may also serve as a hand grip. This portion of sector part 10 extending to the perpendicular edge 40, and aperture 38, may be considered as optional refinements which could be omitted in a more basic embodiment of the instrument in which sector parts 10 and 12 could be made to have identical outline shapes.

Between knob 20 and pivot pin 14, sector parts 10 and 12 each have three round openings punched out as shown: these optional openings lighten the weight of the instrument with no significant loss of strength.

Parts 10 and 12 may be punched out from aluminum extruded in the form of a continuous flat strip having a double flange along one edge; typically both the flanges and the plate regions are made 0.17" thick and the flanges are made 1.56" in total width by 11" long. The exact dimensions of the flange are not critical, however for orthogonal accuracy when the instrument is used sitting upright or resting on either side against a flat surface such as a saw table, the three outer surfaces of each flange may be machined or otherwise held to close tolerance.

Knob 20 is made of brass, 1" in diameter and 0.25" wide at its knurled circumference for good finger gripping. Stud 24 and knob 20 are threaded 1/4-28 to facilitate positive locking of sector parts 10 and 12 together at any angular position within the adjustment range. The flat washers, including washers 26A and 26B, are made from brass.

Four mounting holes 42, sized for common #10 hardware, are provided in each of the flanges 16 and 18 near their corners as shown (two of the holes in flange 16 are not visible in FIG. 1) to allow the flanges to be extended in length and/or width to increase the effective size of the instrument for particular applications such as drafting.

Figure 2:
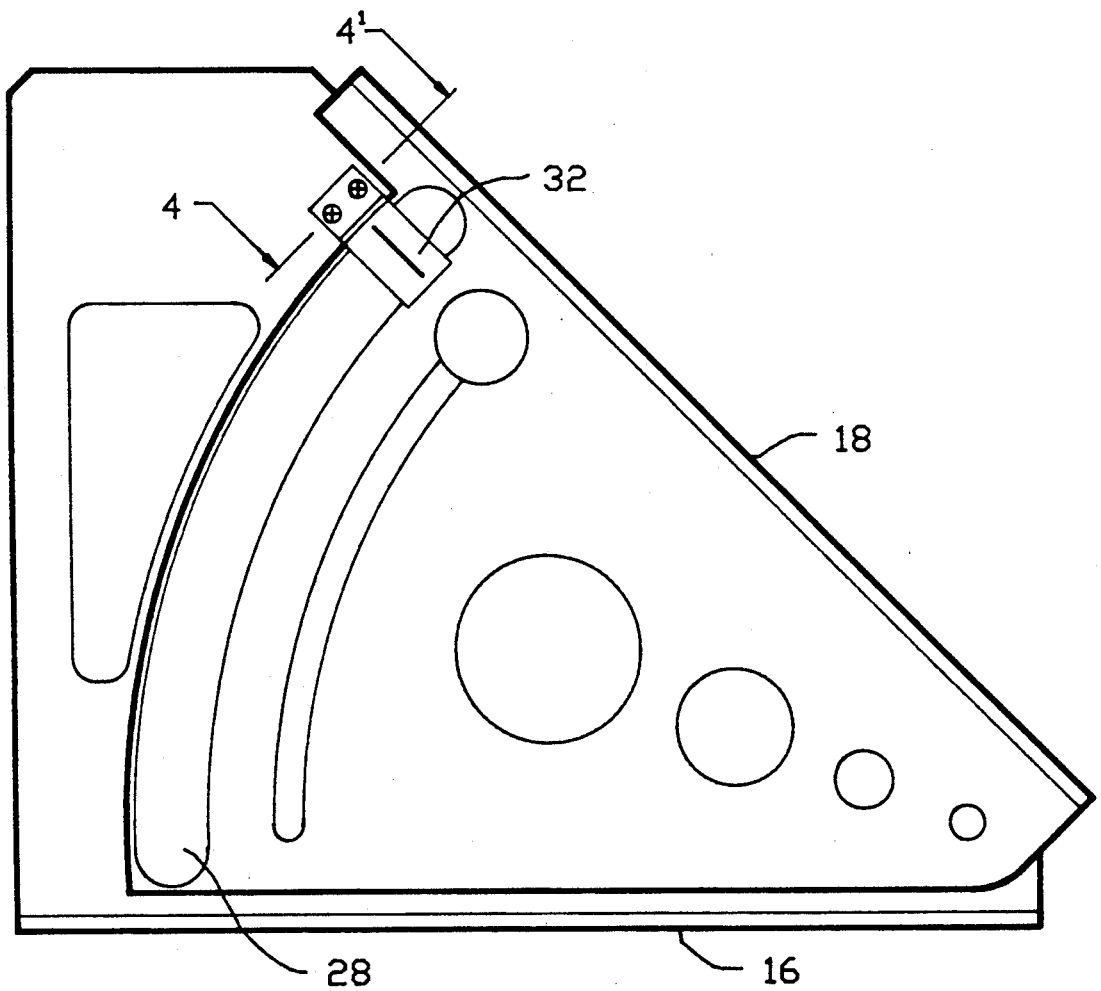
FIG. 2 is an elevation of the instrument of FIG. 1 set at a 45 degree angle.

In FIG. 2, the instrument is shown in its "closed" setting providing an angle of 45 degrees between flanges 16 and 18, as indicated by cursor 32 at one end of scale 28.

Figure 3:
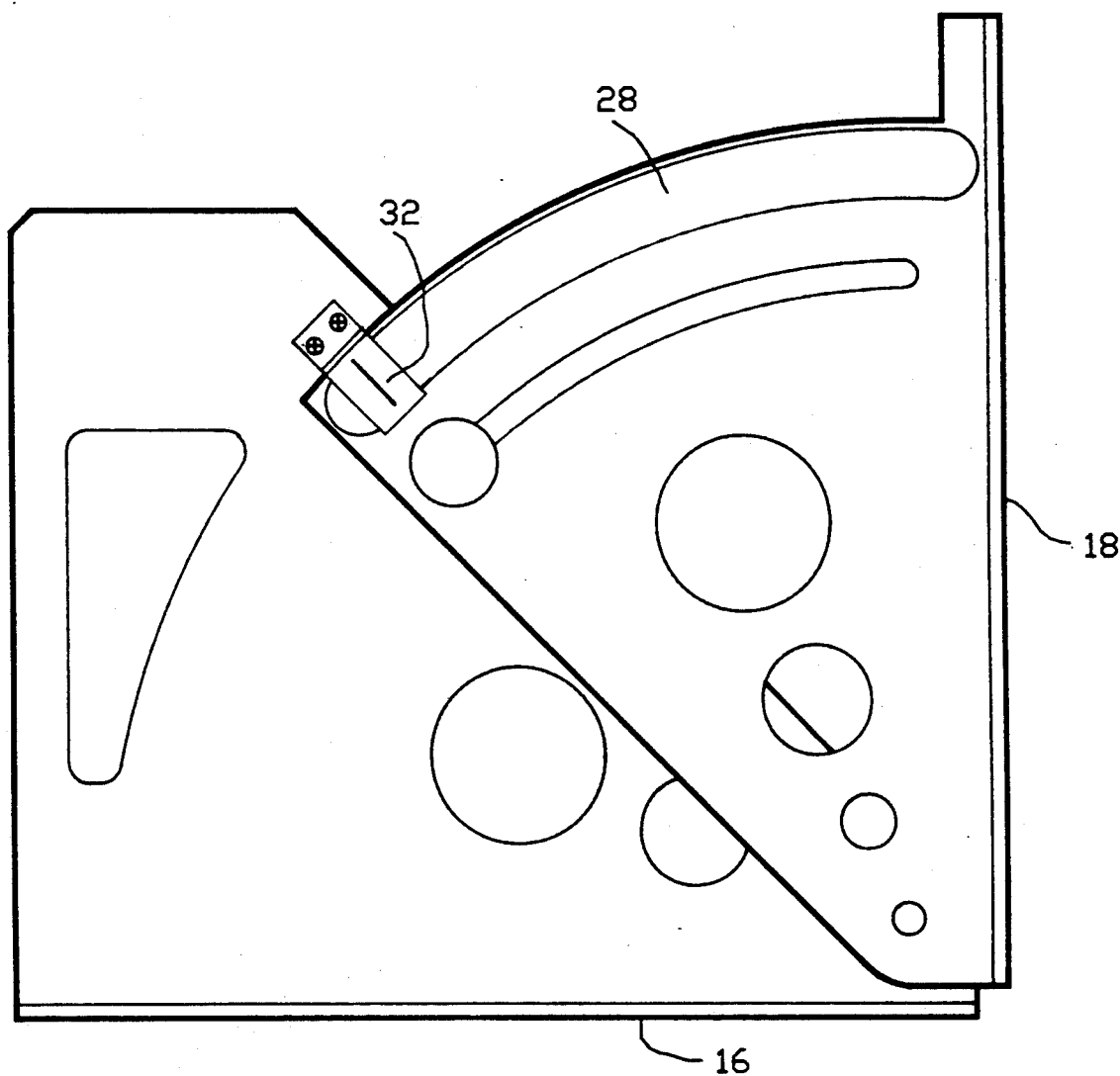
FIG. 3 is an elevation of the instrument of FIG. 1 set at a 90 degree angle.

In FIG. 3, the instrument is shown in its "open" setting providing an angle of 90 degrees between flanges 16 and 18, as indicated by cursor 32 at the other end of scale 28.

Figure 4:
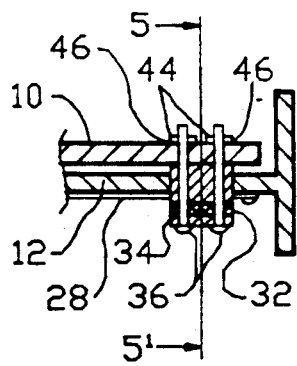
FIG. 4 is a cross section taken through 4—4' of FIG. 2.

FIG. 4, a cross section taken at 4—4' of FIG. 2, shows scale 28, immediately behind cursor 32 which is clamped in a channel in cursor mounting block 34 by a pair of machine screws 36, traversing block 34 and sector part 10, retained by a pair of nuts 44 and lock washers 46.

Figure 5:
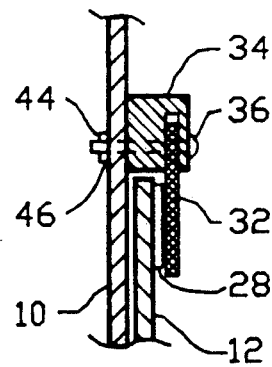
FIG. 5 is a cross section taken through 5—5' of FIG. 4.

FIG. 5, a cross section taken at 5—5' of FIG. 4, shows the spatial relationship between sector part 10, cursor mounting block 34, screws 36, cursor 32, scale 28, sector part 12, nuts 44 and lock washers 46. The channel in block 34 is made to be a close fit with cursor 32 so that tightening the two screws 36 will distort block 34 slightly and thus clamp cursor 32 in place by its upper portion. As an alternative, block 34 could be made in two pieces: a spacer block and a cap plate, sandwiching the cursor 32.

Figure 6:
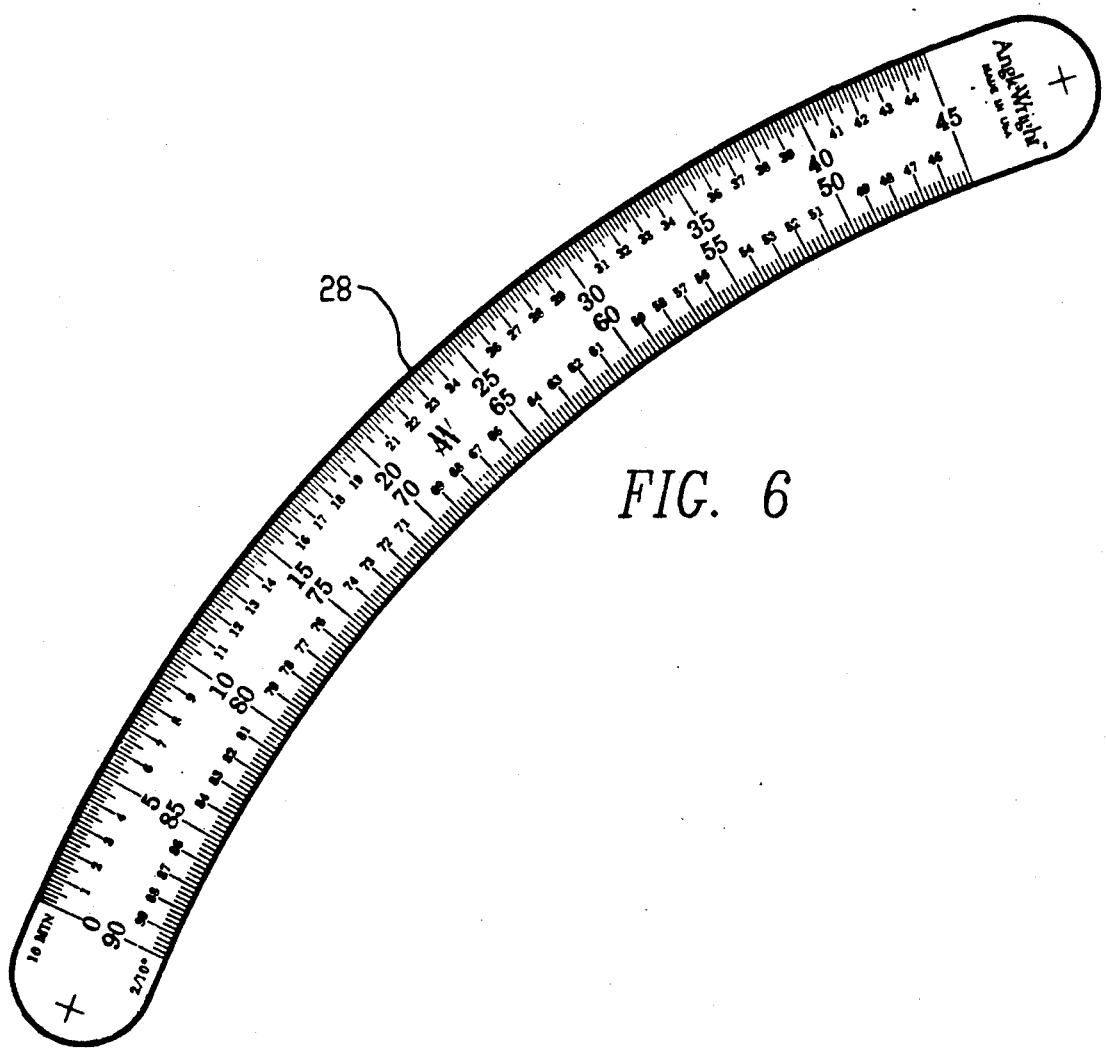
FIG. 6 is a representation of the scale of the instrument of FIGS. 1-3.

FIG. 6 shows a representation of scale 28. The lower set of numerals indicates the angle between the two flanges ranging from 45 to 90 degrees, while the upper set of numerals indicates the angle between flange 18 and edge 40 (refer to FIG. 1) ranging from 0 to 45 degrees, i.e. the complementary angle: 90 degrees minus the reading on the lower numerals. The upper markings provide divisions of 10 minutes (1/6 degree) while the lower markings provide divisions of 2/10 degree. The scale is held to an accuracy better than $+/-2$ minutes of arc non-accumulative.

There are many potential fields of application and modes of operation in which the instrument may be used, of which the following examples are typical.

Referring again to FIG. 1, the instrument may set to any desired angle by first adjusting the two sectors, with knob 20 loosened, to form the desired angle as indicated by cursor 32 on scale 28 and then locking the sectors together by tightening knob 20: washers 26A and 26B act as friction devices to prevent any shifting of the angle while tightening knob 20.

To set the tilt of a table saw blade, the instrument is set to the desired angle and positioned with one flange on the table and the other against the blade; the flange on the table will allow the instrument to rest in place without hand support, freeing both hands of the user to adjust the saw mechanism to match the angle set on the instrument.

For adjusting the angle of the miter fence of a power saw for angled crosscuts, the instrument may be laid on either side with one flange contacting the fence and the other gauging the saw blade. Various other machine adjustments may be made in a similar manner.

For use as a workpiece guide in conjunction with a power saw or other machine, the instrument may be locked at the desired angle and clamped in place by one of the flanges or by the opening 38.

For measuring the angle between two surfaces or lines, the lock knob may be left loosened while the two flanges are aligned with the surfaces or lines to be measured, then the angle is indicated on the scale by the cursor: the reading may then be stored by retightening the lock knob.

As a drafting aid or for marking angled lines on a workpiece, the instrument is simply set to a desired angle and locked at that angle by the lock knob.

Extensions may be clamped onto to any of the three straight edges, or screwed onto flange 16 through the holes provided.

Calibration (or recalibration) may be performed by opening the instrument to form an angle of 90 degrees as shown in FIG. 3, nesting the two flanges in a known 90 degree square, locking the two sector parts together with the knob, and then aligning the cursor with the end marking of the scale. The cursor mounting holes are made oversize to allow such alignment with the two cursor clamping screws temporarily loosened.

For certain purposes where it is desired to increase the coefficient of friction at the surfaces of the flanges, a strip of fine grit adhesive sandpaper or equivalent frictional material may be added.

As a refinement to the cursor 32 (FIG. 1) it may be formed as a lens to provide magnification of the scale markings.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An adjustable angle instrument, especially suited to set up power saws and to guide workpieces in operations such as woodworking, comprising in combination;
   a first sector part formed as a flat plate having a generally sector-shaped outline defining a pair of straight edges forming a 45 degree angle converging toward an apex region, one of said edges being formed along its full length as a double flange extending perpendicularly from the plate in both opposite directions so as to define a T-shaped cross section along the flanged edge, said first sector part being configured to have, at an end thereof opposite the apex region, a further extended flat region defining an edge perpendicular to the flanged edge, the extended flat region including an opening for use as a clamping region and as a hand grip for grasping the instrument;
   a second sector par d as a flat plate having a substantially sector-shaped outline defining a pair of straight edges forming a 45 degree angle converging toward an apex region, one of said edges being formed along its full length as a double flange extending perpendicularly from the plate in both opposite directions so as to define a T-shaped cross section along the flanged edge;
   pivot means, traversing said first sector part and said second sector part at a designated pivot point in the apex region of each of said sector parts, adapted to captivate said sector parts together in a pivoted assembly forming an adjustable sector shape such that the two flanged edges are caused to define an adjustable angle which may be varied within an adjustment range from 45 to 90 degrees;
   locking means adapted to lock said first and second sector parts together releasably at any angle selected within the adjustment range;
   an arcuate scale attached to said second sector part disposed concentrically relative to the pivot point in a region substantially removed from the apex region and marked in a manner to provide readings of the adjustable angle between the two flanged edges, and of the adjustable angle between the perpendicular edge of said first sector part and the flanged edge of said second sector part;
   a transparent cursor, marked with a hairline, disposed adjacent to said scale, secured to said first sector part by cursor mounting means, and configured to cooperate with said scale in a manner to provide the visual angle readings.

2. The adjustable angle instrument as defined in claim 1 wherein said locking means comprises a knurled knob threadedly engaging a stud affixed to said first sector part, said stud traversing a slot configured in said second sector part and defining an elongated arcuate shape centered on said pivot point so as to permit pivoted movement between said sector parts over the adjustment range, whereby said sector parts may be locked together at any selected angle within the adjustment range by tightening said knob.

3. The adjustable angle instrument as defined in claim 1 wherein said cursor mounting means comprises:
   a cursor mounting block, disposed against said first sector part in proximity to said scale, having a channel closely engaging a portion of said cursor;
   a pair of machine screws traversing through a corresponding pair of holes in said mounting block in a region including the channel, through a corresponding pair of holes in the engaged portion of said cursor, and through a pair of corresponding holes in said first sector part, each of said screws being secured at an end thereof by a machine nut and a lock washer;
   the holes in said curser being elongated such that, with said screws loosened, said cursor may be shifted laterally for alignment with said scale, whereupon said cursor may be clamped in place by tightening said screws into the nuts.

4. The adjustable angle instrument as defined in claim 1 wherein said pivot means comprises a metal pivot pin retained by a spring-loaded C-washer.

5. The adjustable angle instrument as defined in claim 4 further comprising a flat washer engaged on said pivot pin, disposed between said first sector part and said second sector part, constituting a spacer.

6. The adjustable angle instrument as defined in claim 1 wherein said first and second sector parts are made from aluminum extruded in a continuous strip having a flanged edge.

7. The adjustable angle instrument as defined in claim 1 further comprising friction-increasing means disposed on outward facing surfaces of said flanges.

8. The adjustable angle instrument as defined in claim 1 wherein said arcuate scale is marked in a range from 0 to 45 degrees indicating the adjustable angle between the perpendicular edge of said first sector part and the flanged edge of said second sector part, and in a range from 90 to 45 degrees indicating the adjustable angle between the two flanged edges.

9. An adjustable angle instrument, especially suited to set up power saws and to guide workpieces in operations such as woodworking, comprising in combination;
   a first sector part formed as a flat plate having a generally sector-shaped outline defining a pair of straight edges forming a 45 degree angle converging toward an apex region, one of said edges being formed along its full length as a flange extending perpendicularly from the plate in both opposite directions so as to define a T-shaped cross section along the flanged edge, said first sector part having, at an end thereof opposite the apex region, a further extended flat region defining an edge made precisely perpendicular to the flanged edge, the extended flat region including an opening adapted to act as a clamping region and as a hand grip for grasping the instrument;
   a second sector part formed as a flat plate having a substantially sector-shaped outline defining a pair of straight edges forming a 45 degree angle converging toward an apex region, one of said edges being formed along its full length as a flange extending perpendicularly from the plate in both opposite directions so as to define a T-shaped cross section along the flanged edge;

a metal pivot pin, retained by a spring loaded C-washer, traversing said first sector part and said second sector part at a designated pivot point in the apex region of each of said sector parts, adapted to captivate said sector parts together in a pivoted assembly forming an adjustable sector shape such that the two flanged edges are caused to define an adjustable angle which may be varied within an adjustment range from 45 to 90 degrees;

a brass knurled knob threadedly engaging a stud affixed to said first sector part, said stud traversing a slot configured in said second sector part and defining an elongated arcuate shape centered on said pivot point so as to permit said sector parts to pivot over the adjustment range, whereby said sector parts may be locked together releasably at any selected angle within the adjustment range by tightening said knob;

an arcuate scale calibrated in degrees, attached to said second sector part, disposed concentrically relative to the pivot point in a region substantially removed from the apex region; and a cursor mounting block, secured to said first sector part;

a cursor, held in a channel in said mounting block by screw clamping means, configured and positioned so as to cooperate with said scale in a manner to provide a visual reading of the adjustable angle between the two flanged edges;

a pair of machine screws traversing openings in a cap plate and in the cursor and threadedly engaging the mounting block, thus sandwiching a portion of the cursor between said cap and said block, the openings in said cursor being dimensioned such as to enable said cursor to be shifted laterally in location for calibration purposes;

said first and second sector parts being made from extruded aluminum in the form of a continuous strip having a flanged edge.

10. The adjustable angle instrument as defined in claim 9 further comprising a first flat washer, engaged on said stud between said knob and said first sector part, serving as a friction device for preventing angle shifting when said first sector part and said second sector part are being locked together by tightening said knob.

11. The adjustable angle instrument as defined in claim 10 further comprising:

a second flat washer, engaged on said pivot pin and disposed between said first sector part and said second sector part, constituting a spacer therebetween;

a third flat washer, engaged on said stud, disposed between said first sector part and said second sector part, serving as a spacer and as a friction device for preventing angle shifting when said first sector part and said second sector part are being locked together by tightening said knob.

12. The adjustable angle instrument as defined in claim 9 wherein said cursor is shaped as a lens so as to provide magnification of an adjacent portion of said scale.

* * * * *